(12) United States Patent
    Takeda

(10) Patent No.: US 10,949,360 B2
(45) Date of Patent: Mar. 16, 2021

(54) INFORMATION PROCESSING APPARATUS

(71) Applicant: Mitsubishi Electric Corporation, Tokyo (JP)

(72) Inventor: Seidai Takeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/321,107

(22) PCT Filed: Sep. 30, 2016

(86) PCT No.: PCT/JP2016/079083
    § 371 (c)(1),
    (2) Date: Jan. 28, 2019

(87) PCT Pub. No.: WO2018/061192
    PCT Pub. Date: Apr. 5, 2018

(65) Prior Publication Data
    US 2019/0213142 A1    Jul. 11, 2019

(51) Int. Cl.
    *G06F 12/00*    (2006.01)
    *G06F 12/123*    (2016.01)
    *G06F 12/0815*    (2016.01)
    *G06F 12/12*    (2016.01)
    *G06F 12/08*    (2016.01)
    *G06F 12/0864*    (2016.01)

(52) U.S. Cl.
    CPC .......... *G06F 12/123* (2013.01); *G06F 12/08* (2013.01); *G06F 12/0815* (2013.01); *G06F 12/12* (2013.01); *G06F 12/0864* (2013.01)

(58) Field of Classification Search
    None
    See application file for complete search history.

(56) References Cited

U.S. PATENT DOCUMENTS

2006/0069876 A1* 3/2006 Bansal ................ G06F 12/121
                                                    711/134
2009/0113135 A1* 4/2009 Cain .................. G06F 12/126
                                                    711/135

(Continued)

FOREIGN PATENT DOCUMENTS

JP    2010198129 A    9/2010
JP    2010244435 A    10/2010

OTHER PUBLICATIONS

Office Action dated Feb. 18, 2020, issued in corresponding Japanese Patent Application No. 2018-541843, 8 pages including 4 pages of English translation.

(Continued)

*Primary Examiner* — Daniel D Tsui
(74) *Attorney, Agent, or Firm* — Buchanan Ingersoll & Rooney PC

(57) ABSTRACT

The information processing apparatus is provided with a plurality of arithmetic devices, a memory unit shared by the plurality of arithmetic devices, and a cache device. The cache device divides the memory space of the memory unit into a plurality of regions, and includes a plurality of caches in the same hierarchy, each of which is associated with a respective one of the plurality of regions. Each cache includes a cache core configured to exclusively store data from a respective one of the plurality of regions.

15 Claims, 10 Drawing Sheets

(56) References Cited

U.S. PATENT DOCUMENTS

2012/0030430 A1    2/2012  Hayashi
2015/0095580 A1*  4/2015  Liu ..................... G06F 12/0833
                                                                   711/130

OTHER PUBLICATIONS

Culler, et al., "Snoop-Based Multiprocessor Design", Parallel Computer Architecture: A Hardware/Software Approach, 1st Edition, Morgan Kaufmann, Aug. 1998, pp. 377-452.

International Search Report (PCT/ISA/210) dated Nov. 1, 2016, by the Japan Patent Office as the International Searching Authority for International Application No. PCT/JP2016/079083.

Written Opinion (PCT/ISA/237) dated Nov. 1, 2016, by the Japan Patent Office as the International Searching Authority for International Application No. PCT/JP2016/079083.

* cited by examiner

FIG.4

EXEMPLRY LRU TABLE

|  | | WAY ID | | | |
|---|---|---|---|---|---|
|  | | 0 | 1 | 2 | 3 |
| SET ID | 0 | | | | |
|  | 1 | | | | |
|  | 2 | 1 | 3 | 2 | 4 |
|  | 3 | | | | |
|  | ⋮ | | | | |
|  | M−1 | | | | |

FIG.5

EXEMPLRY MRU TABLE

| ENTRY NUMBER | ARITHMETIC DEVICE ID | SET ID | WAY ID |
|---|---|---|---|
| 0 |  |  |  |
| 1 |  |  |  |
| 2 |  |  |  |
| 3 |  |  |  |

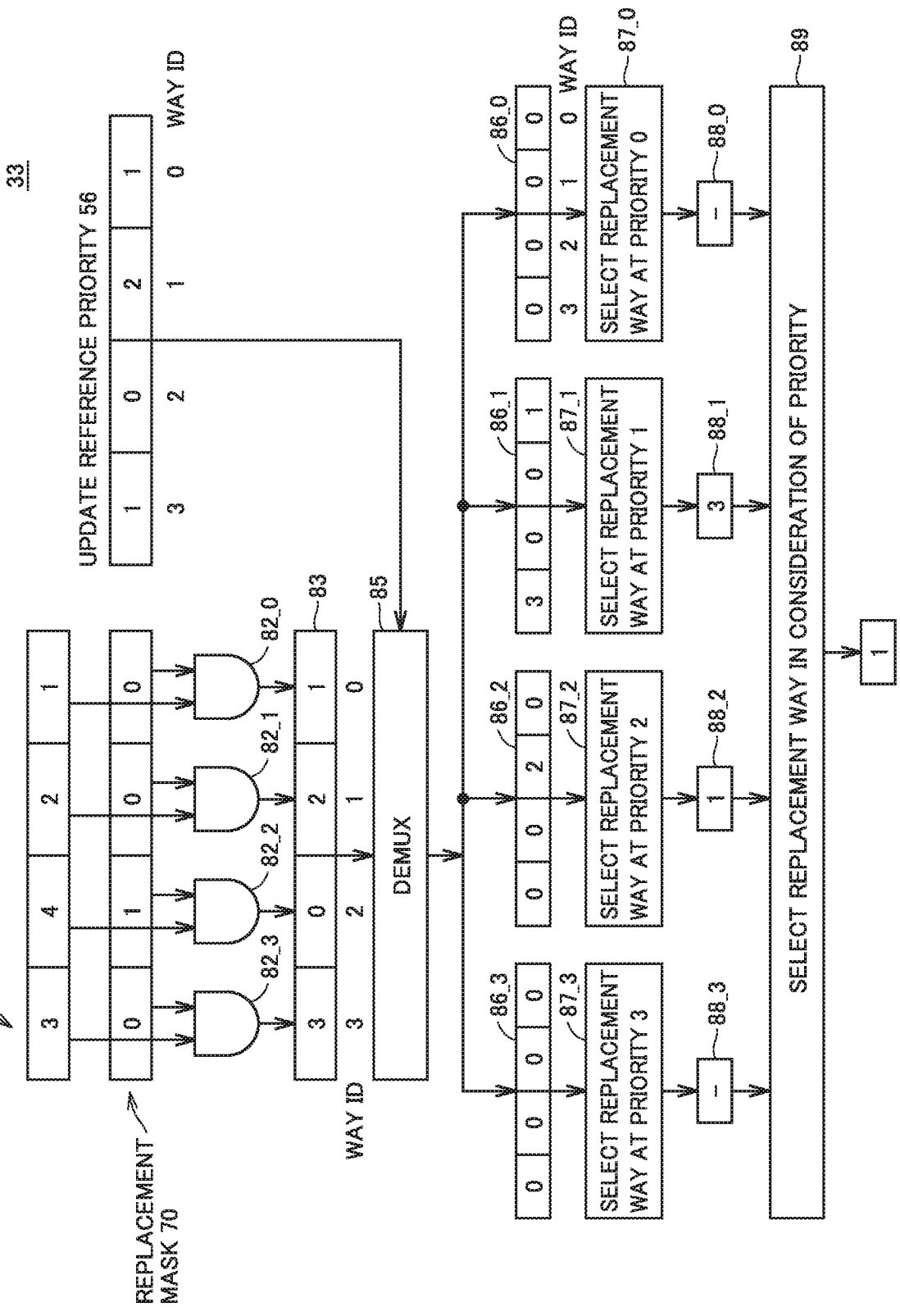

# INFORMATION PROCESSING APPARATUS

TECHNICAL FIELD

The present disclosure relates to an information processing apparatus, and is suitably used for, for example, an information processing apparatus including a plurality of arithmetic devices, a memory unit shared by the arithmetic devices, and a plurality of caches.

BACKGROUND ART

Acceleration of Data Processing by ASIC, FPGA and the Like

In recent years, ASIC (Application Specific Integrated Circuit), FPGA (Field Programmable Gate Array) and the like are utilized for accelerating the data processing in a wide range from an embedded computer to a high performance computer (HPC). In ASIC and FPGA, by building a plurality of arithmetic devices on a silicon die and mutually connecting the plurality of arithmetic devices, procedures of decoding instructions, loading date from registers, storing date into registers, and the like, which are executed in a conventional CPU (Central Processing Unit), can be eliminated. Accordingly, the data processing can be performed efficiently with high operational parallelism.

Application of DRAM by ASIC and FPGA

Up to now, a flip-flop circuit, a SRAM (Static Random Access Memory) or the like is used in ASIC and FPGA for holding input/output data to each arithmetic device. Meanwhile, in recent years, along with the increase of the data size to be handled, systems that use large capacity memory (hereinafter referred to as "memory") such as DRAM (Dynamic Random Access Memory) for holding data are increasing.

However, since the memory is slower than each arithmetic device built on ASIC or FPGA, the memory access often becomes a bottleneck of system performance.

Prior Art Related to Cache in Shared Memory Scheme

Caching is known as a technique to mask the access latency to a low-speed memory. A great number of researches and developments have been made on caching configuration in a multiprocessor system which is a typical example of a configuration in which the memory is shared by a plurality of arithmetic devices. In general, the multiprocessor system has a cache hierarchy composed of a plurality of caches having different speeds and capacities (see, for example, David Culler and 2 others, "Parallel Computer Architecture: A Hardware/Software Approach", Chapter 6 (Non-Patent Literature 1)).

Private Cache Scheme

In a level 1 or 2 cache with a high speed and a low capacity located close to a processor, a private cache scheme that allocates dedicated caches to each processor is often used (see, for example, Chapter 6 of Non-Patent Literature 1). By allocating dedicated caches, the performance degradation due to the access competition from each processor can be prevented.

In the private cache scheme, a coherence mechanism is provided for performing data synchronization between the respective caches. However, since processing is allocated to each processor on a per process basis, there is a small amount of data shared between the processors, and the effect on performance due to data synchronization is small. Further, there is also a configuration in which the coherence mechanism is not provided and the shared data is directly stored in memory without being arranged on the caches.

Shared Cache Scheme

On the other hand, in a last level cache with a low-speed and a large capacity located close to the memory, a shared cache scheme in which a single cache is accessed by a plurality of access request source circuits is often used (see, for example, Chapter 6 of Non-Patent Literature 1). In the shared cache scheme, the access competition between the higher level circuits may occur. However, since a higher lever cache accesses a lower level cache only when a cache mistake occurs in the higher level cache, the occurrence frequency of the access competition is low, and the coherence mechanism is unnecessary.

Data Replacement Scheme

In the shared cache scheme, data being used by a processor may be replaced from the cache due to accessing by another processor. In particular, if the data used by a processor that performs memory access at a low frequency is replaced by another processor that performs memory access at a high frequency, the performance degradation occurs in the former processor. In addition, when each processor repeatedly accesses the same set (a set is a data management unit in the cache), excessive data replacement called thrashing occurs, which remarkably degrades the performance of both processors.

To solve the above problem, there is known a method which exclusively allocates a data management unit in a cache called a way to each processor or to each process executing on the processor (Patent Literature 1).

CITATION LIST

Patent Literature

PTL 1: Japanese Patent Laying-open No. 2010-244435

Non Patent Literature

NPL 1: David Culler and 2 others, "Parallel Computer Architecture: A Hardware/Software Approach", 1st Edition, Morgan Kaufmann, August 1998

SUMMARY OF INVENTION

Technical Problem

A system, to which the present disclosure is mainly directed, is provided with a plurality of arithmetic devices implemented by an ASIC or an FPGA, and has characteristics different from those of a conventional multiprocessor. Thus, a high-performance system can not be implemented by using a cache configuration for a system comprising conventional multiprocessors.

Specifically, in the system according to the present disclosure, a large amount of data to be exchanged among the arithmetic devices is arranged on the memory. Therefore, if the private cache scheme is used in higher level caches as in the prior art, the data synchronization frequently occurs, which degrades the performance greatly. On the other hand, the number of arithmetic devices is larger than the number of processors in a multiprocessor system, and therefore, if the shared cache scheme is adopted, the performance may be greatly degraded by the access competition or thrashing.

Moreover, the data replacement scheme based on the dedicated way allocation as disclosed in Patent Literature 1 is based on the assumption that the shared data is not stored in cache. On the other hand, in the system according to the present disclosure, since the main purpose is to store the input/output data for each arithmetic device, it is indispensable that data shared by a plurality of arithmetic devices be arranged on a cache.

The present disclosure has been made in view of the above problems, and the main object thereof is to provide an information processing apparatus which includes a plurality of arithmetic devices and is capable of suppressing the cache access competition and the occurrence frequency of thrashing.

Solution to Problem

The information processing apparatus according to one aspect of the present disclosure includes a plurality of arithmetic devices, a memory unit shared by the plurality of arithmetic devices, and a cache device. The cache device is configured to divide the memory space of the memory unit into a plurality of regions and includes a plurality of caches in the same hierarchy, each of which is associated with a respective one of the plurality of regions. Each cache includes a cache core configured to exclusively store data from a respective one of the plurality of regions.

Advantageous Effects of Invention

Although there are a plurality of caches CS1 to CS4 in the same hierarchy, since the same data is not arranged in each cache CS, a coherence mechanism is unnecessary, which makes it possible to suppress the performance degradation due to data synchronization. Moreover, since the accesses from the plurality of arithmetic devices AR1 to AR4 are distributed to different caches in accordance with the addresses, it is possible to suppress the cache access competition and the occurrence frequency of thrashing. As a result, it is possible to improve the system performance of the information processing apparatus.

BRIEF DESCRIPTION OF DRAWINGS

FIG. 4 is a diagram illustrating an example of an LRU table in a 4-way cache;

FIG. 5 is a diagram illustrating an example of an MRU table;

FIG. 10 is a functional block diagram for explaining the operation of a replacement selecting section in detail.

DESCRIPTION OF EMBODIMENTS

Figure 1:
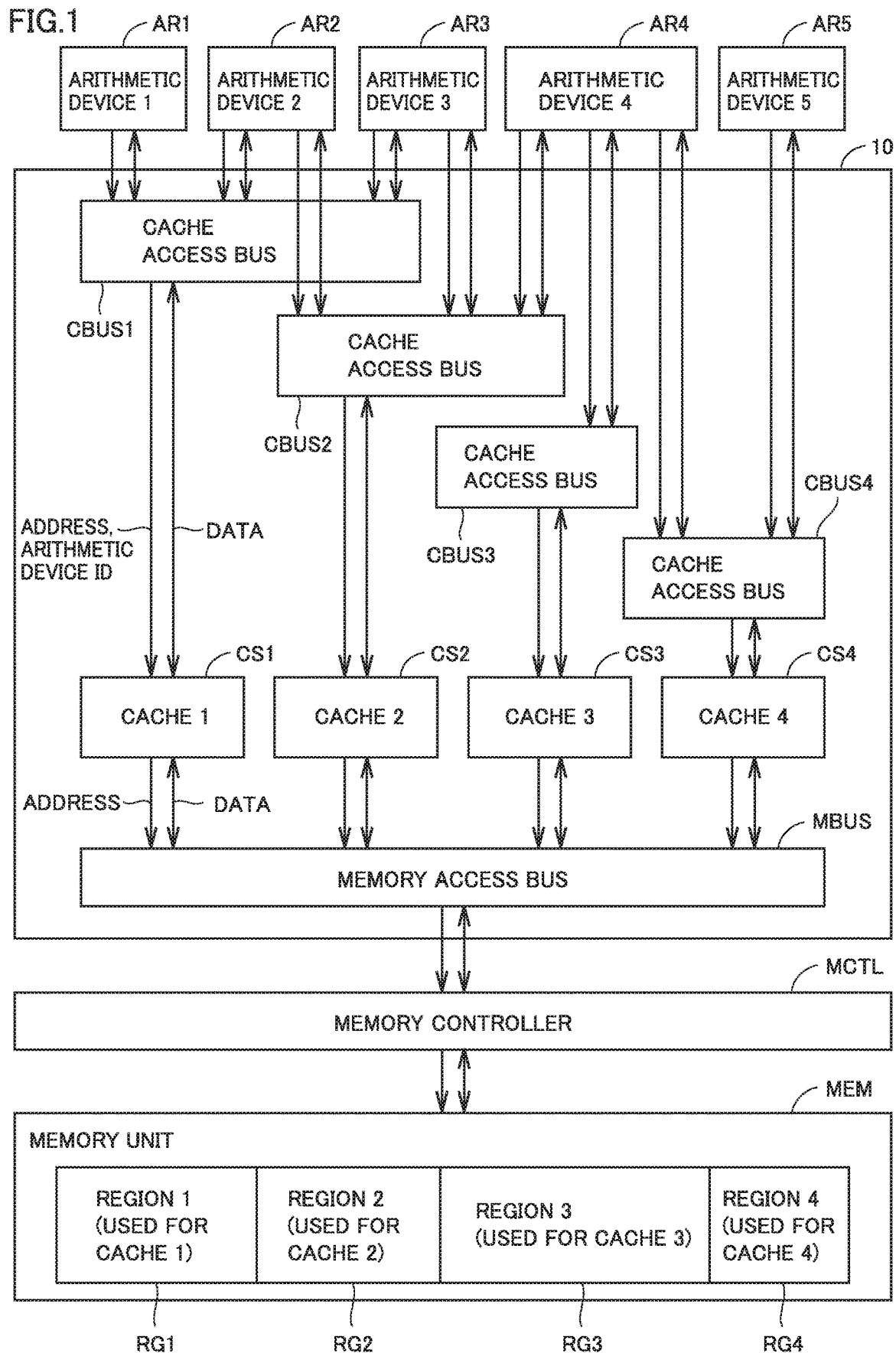
FIG. 1 is a block diagram illustrating a configuration of an information processing apparatus.

Hereinafter, an embodiment will be described in detail with reference to the drawings. It should be noted that the same or corresponding parts will be denoted by the same reference numerals, and the description thereof will not be repeated.

Configuration of Information Processing Apparatus

FIG. 1 is a block diagram illustrating a configuration of an information processing apparatus. The information processing apparatus illustrated in FIG. 1 includes a plurality of arithmetic devices AR1 to AR5, a plurality of caches CS1 to CS4, a plurality of cache access buses CBUS1 to CBUS4, a memory access bus MBUS, a memory controller MCTL including a physical layer, and a memory unit MEM. In the case of mentioning the plurality of arithmetic devices AR1 to AR5, the plurality of caches CS1 to CS4 and the plurality of cache access buses CBUS1 to CBUS4 collectively or generally, they will be described as the arithmetic device AR, the cache CS, and the cache access bus CBUS, respectively.

The number of the arithmetic devices and the number of the caches in FIG. 1 are merely examples and are not limited thereto. Each cache CS is shared by one or more specific arithmetic devices AR. The cache access buses CBUS1 to CBUS4 are connection buses between the arithmetic devices AR1 to AR5 and the caches CS1 to CS4. The memory access bus MBUS is a connection bus between the caches CS1 to CS4 and the memory controller MCTL. Each component will be described in more detail below.

Arithmetic Device

Each arithmetic device AR is assigned with a piece of unique identification information such as an arithmetic device ID (Identification).

Each arithmetic device AR is connected to at least one specific cache CS via an interface. The interface comprises a cache access bus CBUS configured to notify the memory address and the arithmetic device ID of the access source, notify the write data and acquire the read data.

Each arithmetic device AR has a function of selecting an appropriate interface (i.e., a cache access bus CBUS) according to the address of a memory to be accessed, and accessing the cache CS associated with the address.

Cache and Cache Access Bus

Each cache CS includes one interface (a cache access controller 21 in FIG. 2) between each cache CS and the arithmetic device AR, and further includes one interface (a memory access controller 22 in FIG. 2) between each cache CS and the memory controller MCTL. Each cache access bus CBUS is provided between each cache CS and an associated arithmetic device AR.

When each cache CS receives an access request to an address from an arithmetic device AR, and if the data associated with the address is stored in the cache, the cache CS directly returns an access response to the arithmetic device AR. On the other hand, if the data associated with the address is not stored in the cache, the cache CS issues an access request to the memory access bus MBUS and acquires data associated with the address from the memory unit MEM. After the cached data is replaced with the acquired data, the cache CS issues an access response to the arithmetic device AR.

Each cache CS performs a general write-back operation. Specifically, if data is written in a cache CS, the data is later written from the cache CS to the memory MEM when it is replaced.

Memory Access Bus and Memory Controller

The memory access bus MBUS arbitrates an access request from each caches CS and notifies the memory controller MCTL thereof.

When an access request is issued from a cache CS, the memory controller MCTL converts the protocol of the access request into the protocol for the memory unit MEM and issues the converted request command to the memory unit MEM unit so as to perform data acquisition or the like with the memory unit MEM. Based on the result of the performance, the memory controller MCTL issues an access response to the cache CS.

Memory Unit

The memory unit comprises a general-purpose DRAM or the like. In view of the configuration, the internal region of the memory unit MEM is divided into a plurality of regions RG1 to RG4 which are associated with the respective caches CS1 to CS4, and data is exchanged exclusively between each region and a respective cache CS. According to such a configuration, since the same data is not arranged in each different cache CS, a coherence mechanism is not required, which makes it possible to suppress the performance degradation due to data synchronization.

It should be noted that although the memory unit MEM is configured to perform a read operation, a write operation and the like in accordance with an access request or the like issued from the memory controller MCTL, the memory unit MEM itself is not configured to recognize a respective cache.

In the configuration of the information processing apparatus mentioned above, the cache access bus CBUS, the cache CS, and the memory access bus MBUS may be collectively referred to as the cache device 10 where necessary.

Characteristic Data Access in the Present System

Before explaining the internal configuration of the cache, the characteristic data access in a parallel data processing system by ASIC or FPGA will be described firstly.

Specifically, the data access is characterized by that sequential access is prominent because each arithmetic device writes or reads a certain amount of data collectively at the time of accessing a memory. Moreover, the data access is characterized by that the written data by an arithmetic device may be read by the same arithmetic device or another arithmetic device.

Therefore, a data replacement unit on a cache which is also called a line currently accessed by an arithmetic device is likely to be accessed again in the near future by the same arithmetic device. Compared with the line currently accessed by an arithmetic device, a line which has been referenced in the past but not updated is less likely to be referenced again in the near future by the same arithmetic device. On the other hand, a line updated by an arithmetic device is likely to be referenced by the same arithmetic device or another arithmetic device in the near future.

In order to improve the caching effect, it is necessary to use a replacement managing method with high data utilization efficiency while avoiding thrashing, based on the access characteristics mentioned above. Hereinafter, a specific cache configuration and a data replacement scheme will be described.

Internal Configuration of Cache

Figure 2:
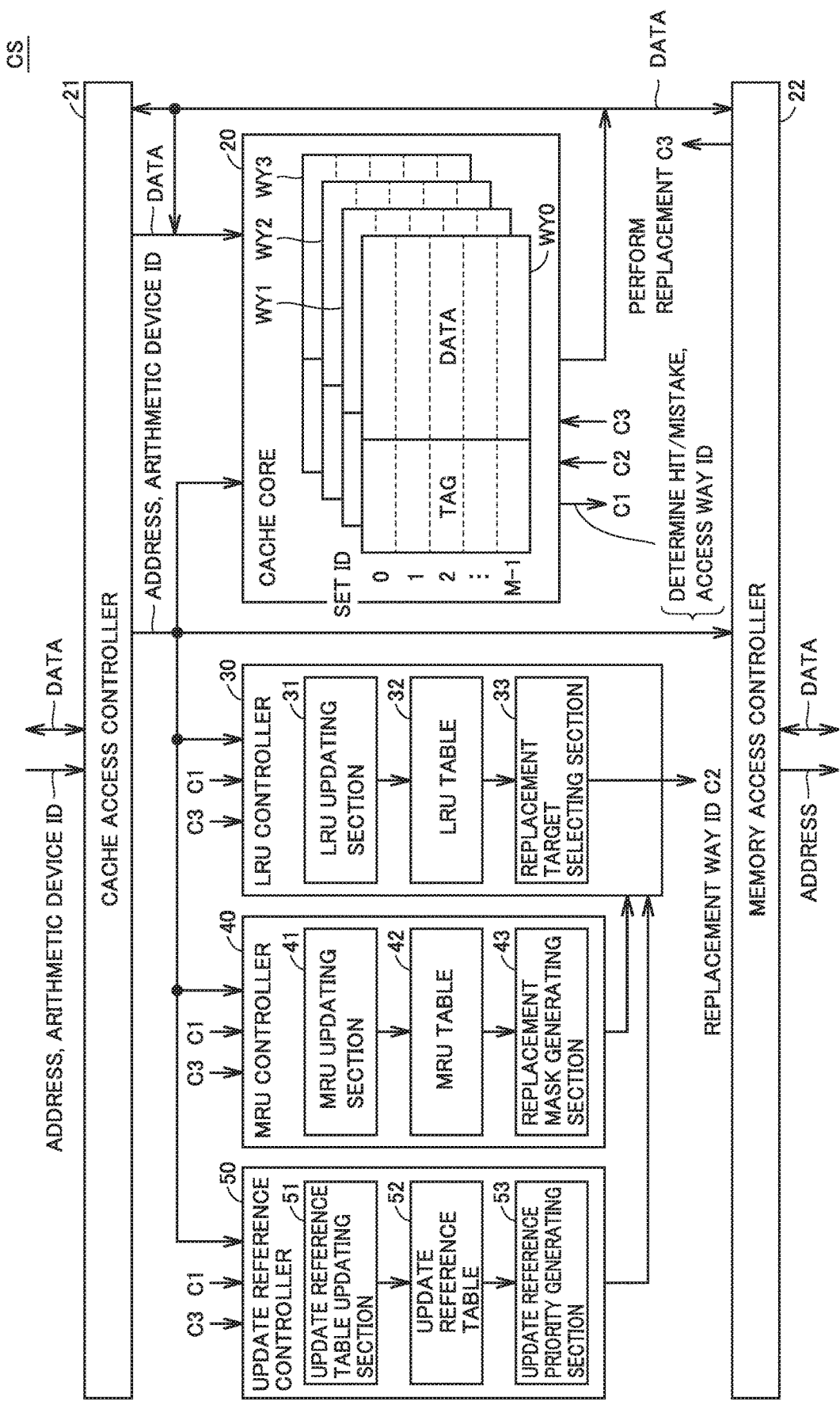
FIG. 2 is a block diagram illustrating an internal configuration of each cache in FIG. 1.

FIG. 2 is a block diagram illustrating the internal configuration of each cache illustrated in FIG. 1. With reference to FIG. 2, each cache CS includes a cache access controller 21, a cache core 20, an LRU controller 30, an MRU controller 40, an update reference controller 50, and a memory access controller 22.

The cache access controller 21 is an interface between each cache CS and each arithmetic device AR.

The cache core 20 comprises a general set associative cache. FIG. 2 illustrates an example in which the cache core 20 is constituted by a 4-way (WY0 to WY3) set associative cache. The cache core 20 has way IDs at a number of 4 (0 to 3) and set IDs at a number of M (0 to M−1).

The LRU controller 30 calculates an access history of ways based on a general LRU (Least Recently Used) algorithm and decides a way to be replaced at the time when a cache mistake occurs. Specifically, the LRU controller 30 includes an LRU table 32 configured to hold the access history of ways in each set, an LRU updating section 31 configured to update the LRU table 32, and a replacement target selecting section 33 configured to determine a way to be replaced at the time when a cache mistake occurs.

The MRU controller 40 calculates a cache position most recently accessed by each arithmetic device AR and generates a mask that instructs a way to be excluded from the replacement target at the time when a cache mistake occurs. Specifically, the MRU controller 40 includes an MRU table 42 configured to hold an MRU (Most Recently Used) line in each arithmetic device AR, an MRU updating section 41 configured to update the MRU table 42, and a replacement mask generating section 43 configured to generate mask information for excluding a way most recently accessed by another arithmetic device AR from the replacement target.

The update reference controller 50 calculates a state indicating the update and the reference after updating by each arithmetic device AR in each line and generates a priority for determining a replacement target at the time when a cache mistake occurs. Specifically, the update reference controller 50 includes an update reference table 52 configured to hold update and reference states for each line, an update reference table updating section 51 configured to update the update reference table 52, and an update reference priority generating section 53 configured to generate a priority for determining a replacement target at the time when a cache mistake occurs.

The memory access controller 22 is an interface between each cache CS and the memory unit MEM, allowing access to the memory unit MEM at the time when a cache mistake occurs.

In the configuration described above, the MRU controller 40 and the update reference controller 50 are optional.

Outline of Operation of Cache

Figure 3:
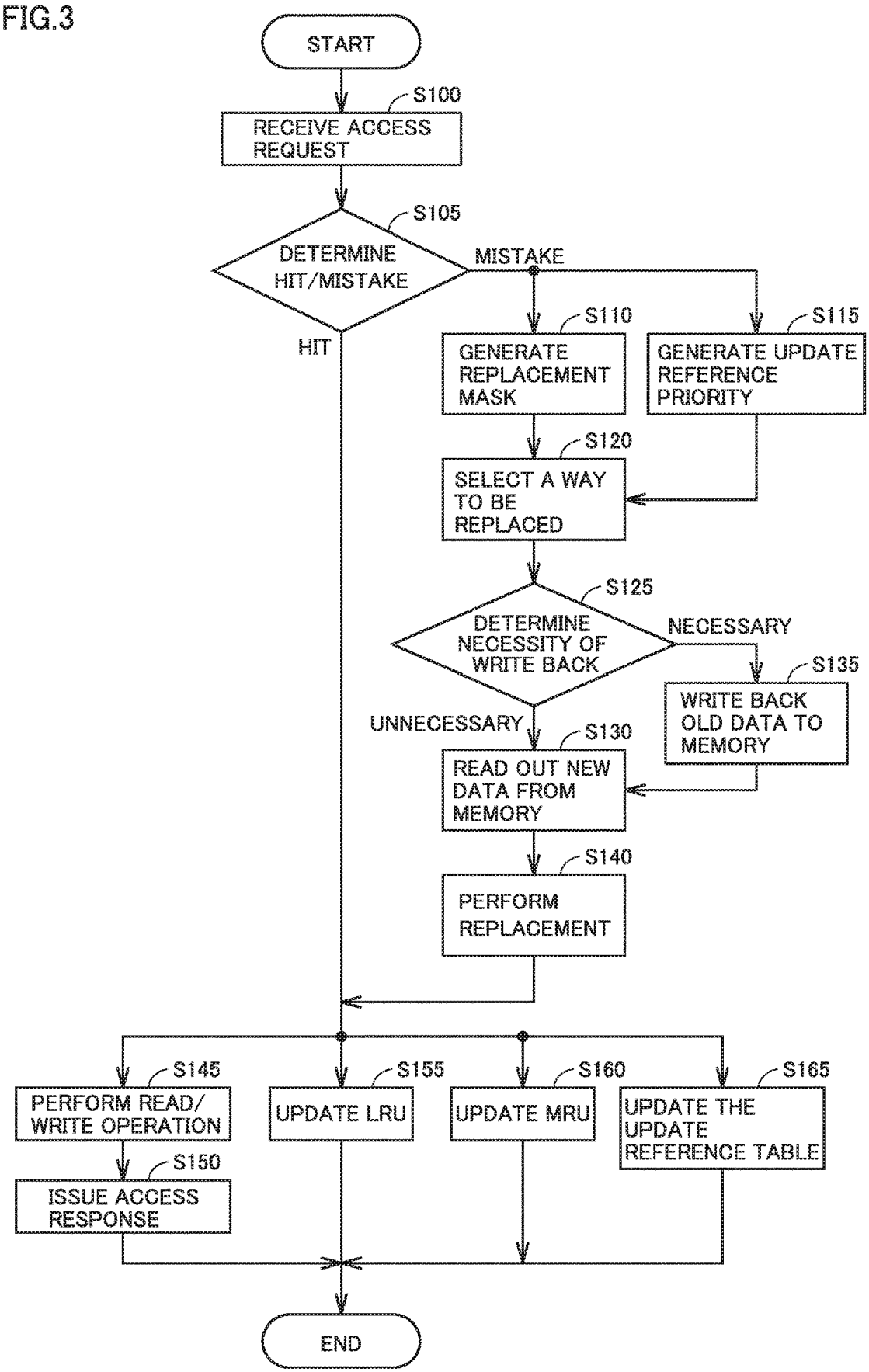
FIG. 3 is a flowchart illustrating the operation of the cache illustrated in FIG. 2.

FIG. 3 is a flowchart illustrating the operation of a cache illustrated in FIG. 2. The outline of the operation of the cache illustrated in FIG. 2 will be described below with reference to FIGS. 2 and 3.

First, the cache access controller 21 receives an access request from the arithmetic device AR (step S100). Specifically, if the access request is a data read request, the cache access controller 21 receives the address of the memory unit MEM and the identification information (i.e., the arithmetic device ID) of the arithmetic device requesting the access. If the access request is a data write request, the cache access controller 21 receives the address of the memory unit MEM, the data to be written and the arithmetic device ID of the arithmetic device requesting the access.

The cache core 20 compares the address contained in the access request and a tag so as to determine a hit or a mistake (step S105). The hit/mistake determination result C1 is sent to the LRU controller 30, the MRU controller 40, and the update reference controller 50. When the determination result is a mistake, the cache core 20 flushes a part of the data and locates the data to be accessed by the arithmetic device AR on the cache core 20. Specifically, the process follows the flowing procedure.

First, the replacement mask generating section 43 generates a mask indicating a way which is not to be replaced (step S110). Concurrently, the update reference priority generating section 53 generates a priority to be used in determining a way to be replaced (step S115).

Next, the replacement target selecting section 33 determines a way to be replaced based on the LRU table 32, the replacement mask and the above-mentioned priority (step S120).

Next, the cache core 20 specifies the position of a line to be replaced based on the way ID (C2 in FIG. 2) of the way to be replaced which is determined in the above step S120 and the set ID associated with the address contained in the access request. Then, a flag associated with the data stored at the specific line position is confirmed (step S125). The flag indicates whether or not the data has been updated after being stored in the cache.

If the flag indicates that the data has been updated, it means that the write back is necessary, the cache core 20 writes back the data (i.e., old data) to the memory unit MEM via the memory access controller 22 (Step S135).

If the flag indicates that the data has not been updated (in other words, the write back is unnecessary) or after the write back to memory in step S135 is completed, the cache core 20 reads out data (i.e., new data) to be stored on the line from the memory unit MEM via the memory access controller 22 (step S130).

When the readout of data is completed, the cache core 20 writes the readout data to the line position to be replaced (step S140). Thereby, the data to be accessed by the arithmetic device AR has been stored (i.e., replaced) in the cache in the case of a cache mistake. A replacement completion notification (C3 in FIG. 2) is transmitted to the cache core 20, the LUR controller 30, the MRU controller 40, and the update reference controller 50.

In the case of a cache hit or after the replacement is completed, the cache core 20 performs a read operation or a write operation on the cache line in accordance with the access request from the arithmetic device AR (step S145), and issues an access response to the arithmetic device AR via the cache access controller 21 (step S150). Concurrently, the MRU table 42, the LRU table 32, and the update reference table 52 are updated in accordance with the access request (steps S155, S160 and S165). After the access response (step S150) is issued and the update is completed (steps S155, S160 and S165), the process returns and waits for receiving the next access request (step S100).

Details of LRU Table and LRU Updating Section

FIG. 4 is a diagram illustrating an example of an LRU table in a 4-way cache. With reference to FIG. 4, the LRU table 32 of FIG. 2 is a functional block configured to show the order of past references to the ways in each set of the cache core 20.

In the example of FIG. 4, the number 1 is assigned to the most recently accessed way in the set, numbers 2 and 3 are assigned to the ways accessed next, and the most recently accessed way is assigned with the number 4. Specifically, since the LRU table information of set ID=2 is $\{1, 3, 2, 4\}$, the way ID of the way that was recently accessed is 0, and the access gets older in the order of way ID=2, 1, 3. Thus, if the (set ID, way ID)=(2, 3) is accessed later, then the LRU table is updated in the order of $\{2, 4, 3, 1\}$ instead of $\{1, 3, 2, 4\}$.

The configuration of the LRU updating section 31 in FIG. 2 is similar to the configuration of an LRU implementation in a general cache.

Details of MRU Table

FIG. 5 is a diagram illustrating an example of an MRU table. The MRU table 42 in FIG. 2 is a functional block configured to show the position (i.e., the set ID and the way ID) in the cache most recently accessed by each arithmetic device AR.

In the example of FIG. 5, the MRU table 42 includes 4 entries, i.e., entry No. 0 to entry No. 3. Each entry comprises 3 fields: arithmetic device ID, set ID, and way ID.

The field of the arithmetic device ID is preliminarily filled with the arithmetic device ID of an arithmetic device AR accessible to the cache. Each time when a cache is accessed by an arithmetic device AR, the set ID and the way ID of the entry associated with the line position in the cache accessed by the arithmetic device AR will be updated.

Multiple entries may be defined for one arithmetic device AR. However, if a plurality of arithmetic devices AR access to a specific set intensively and all the ways are being used by another arithmetic devices AR, it is impossible to select a way to be replaced. Therefore, the upper limit of the number of entries in the MRU table 42 is equal to the number of ways in a cache.

Details of Operation of MRU Updating Section

Figure 6:
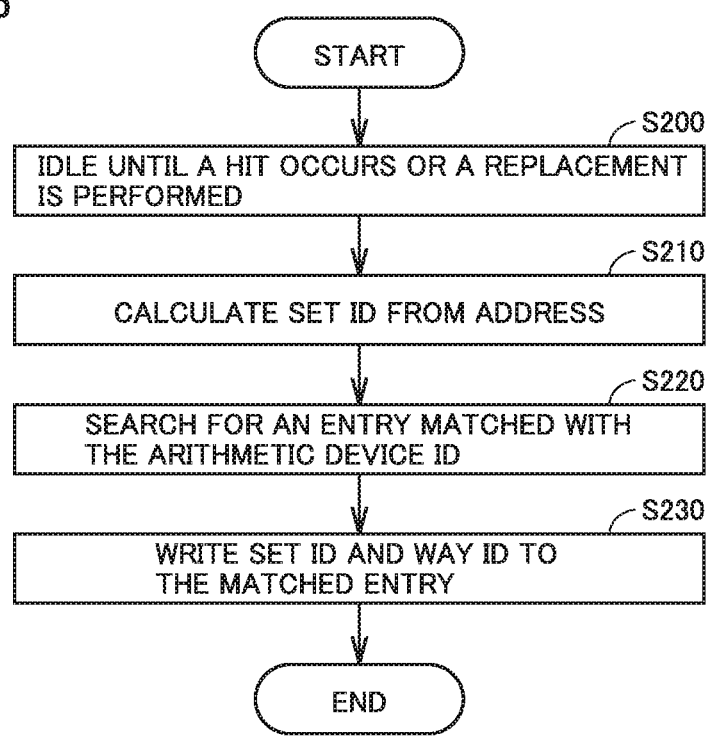
FIG. 6 is a flowchart illustrating the operation of the MRU updating section illustrated in FIG. 2.

FIG. 6 is a flowchart illustrating the operation of the MRU updating section illustrated in FIG. 2. With reference to FIGS. 2 and 6, the MRU updating section 41 is a functional block configured to update the MRU table 42 each time when receiving an access request from the arithmetic device AR.

When a hit occurs in the cache core 20 or when the memory access controller 22 has read out the data newly allocated for replacement after a cache mistake occurs, the MRU updating section 41 starts to update the MRU table 42. Until then, the MRU updating section 41 is idle (step S200).

In order to update the MRU table 42, the MRU updating section 41 first calculates a set ID from the address notified by the cache access controller 21 (step S210).

Next, the MRU updating section 41 searches the MRU table 42 for an entry associated with the arithmetic device ID of an accessing arithmetic device and is currently performing the access (step S220). If there are multiple entries, the entry that was accessed at the older time will be selected.

Next, the MRU updating section 41 writes the set ID calculated in step S210 and the accessed way ID (corresponding to C1 in FIG. 2) acquired from the cache core 20 into the searched entry (step S230). Thereby, the updating of the MRU table 42 is completed.

Details of Replacement Mask Generating Section

Figure 7:
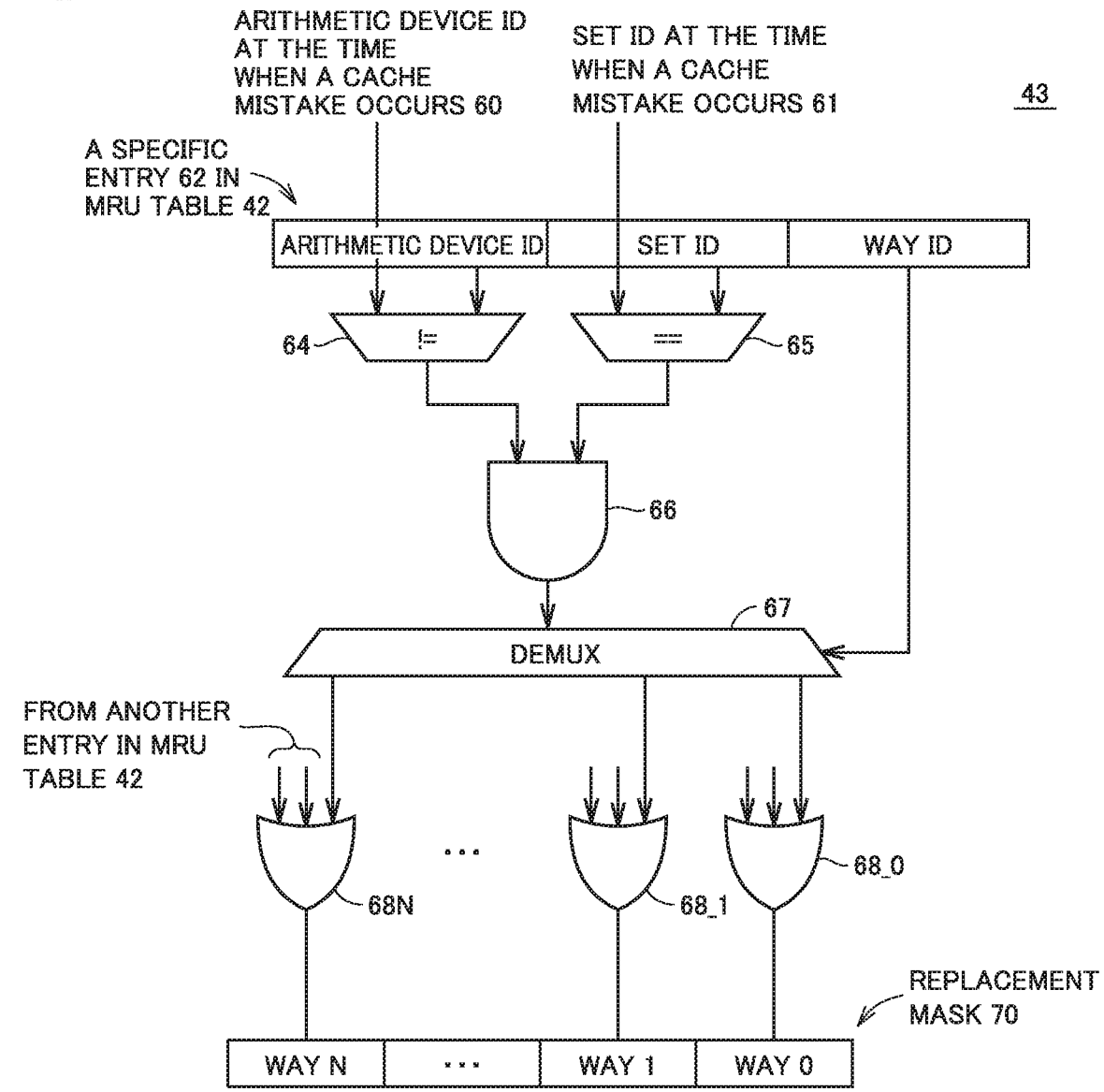
FIG. 7 is a functional block diagram for explaining a replacement mask generating section which operates at the time when a cache mistake occurs.

FIG. 7 is a functional block diagram for explaining a replacement mask generating section which operates at the time when a cache mistake occurs.

First, the replacement mask generating section 43 in FIG. 2 acquires the address and the arithmetic device ID 60 from the cache access controller 21, and calculates the set ID 61 from the address.

Next, an operation unit 64 of the replacement mask generating section 43 determines whether or not the arithmetic device ID 60 acquired in the above is inconsistent with the arithmetic device ID stored in each entry 62 of the MRU table 42. Concurrently, an operation unit 65 of the replacement mask generating section 43 determines whether or not the set ID 61 calculated above is consistent with the set ID stored in the entry 62.

Next, an operation unit 66 obtains the product of the inconsistent confirmation result of the arithmetic device ID from the operation unit 64 and the consistent confirmation result of the set ID from the operation unit 65. In accordance with the way ID stored in the entry 62, a demultiplexer (DEMUR) 67 outputs the operation result by the operation unit 66 to a respective one of output units 68_0 to 68_N. In a specific entry 62, if a way most recently accessed by an arithmetic device AR other than the arithmetic device AR currently performing the access (in other words, the arithmetic device AR which caused a cache mistake) is present in the set, the output to the output unit 68 is 1, otherwise it is 0.

Finally, each of the output units 68 0 to 68_N outputs the sum of the output values obtained for each entry as a replacement mask 70 for a respective way position.

Details of Update Reference Table and Update Reference Generating Section

Figure 8:
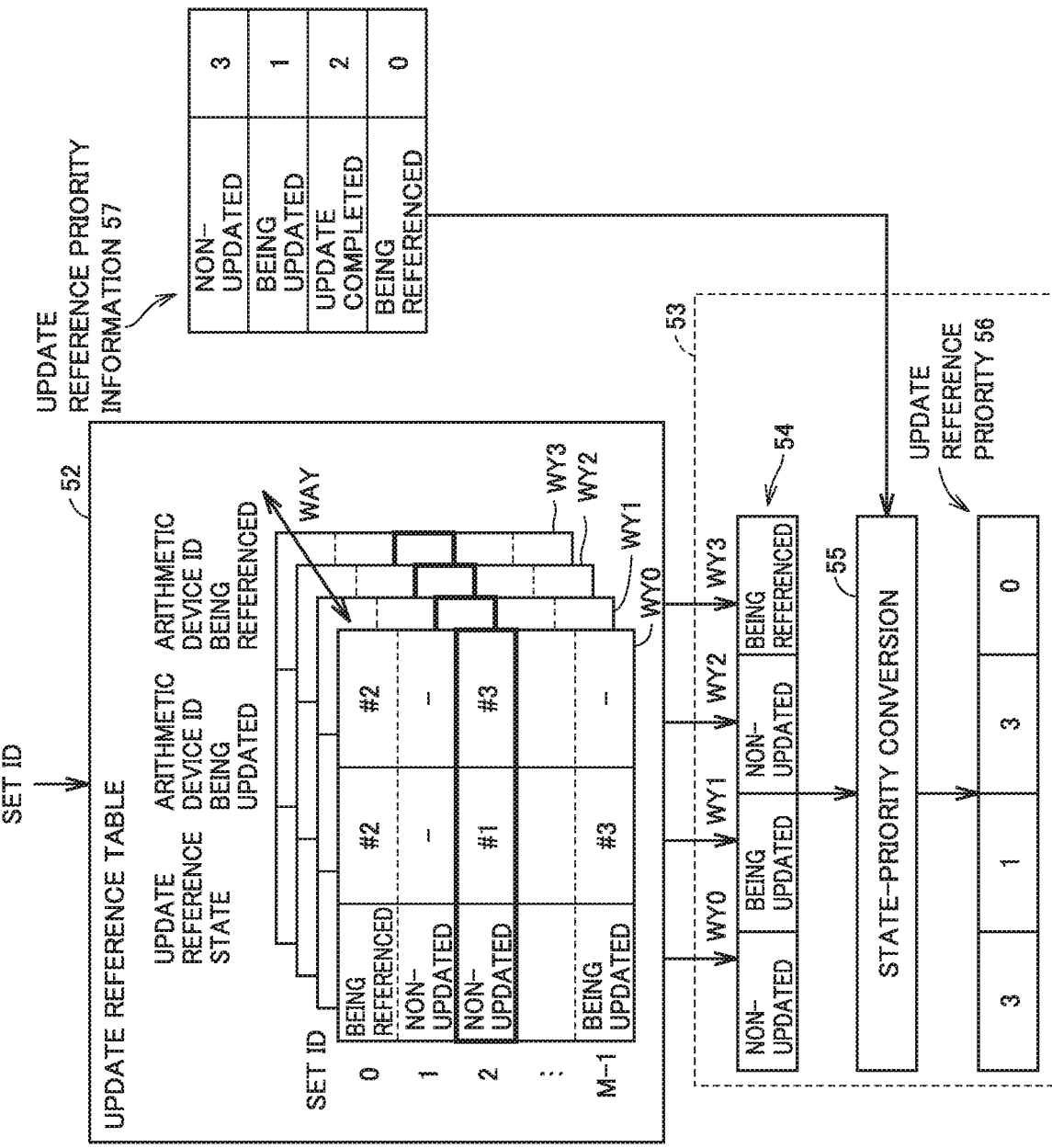
FIG. 8 is a block diagram illustrating a configuration of an update reference table and an update reference priority generating section illustrated in FIG. 2.

FIG. 8 is a block diagram illustrating the configuration of the update reference table and the update reference priority generating section in FIG. 2.

With reference to FIG. 8, the update reference table 52 has entries for each line determined by the set ID and the way ID. Each entry includes 3 fields: an update reference state, an arithmetic device ID being updated, and an arithmetic device ID being referenced. The update reference state indicates the states of a line, including 4 states: non-updated, being updated, update completed, and being referenced. The arithmetic device ID being updated indicates the arithmetic device identification information (i.e., the arithmetic device ID) that is being updated by an arithmetic device AR which is updating the line. The arithmetic device ID being referenced indicates the arithmetic device identification information (i.e., the arithmetic device ID) that is being referenced by an arithmetic device AR which is referencing the line.

Based on the set ID generated from the address accessed by the arithmetic device AR, the update reference priority generating section 53 fetches, from the update reference table 52, the information 54 of each reference update state field associated with the set for each way. A state-priority converting unit 55 of the update reference priority generating section 53 determines an update reference priority 56 for each way based on preset update reference priority information 57. The update reference priority information 57 indicates the correspondence relationship between the update reference state and the priority.

Details of Operation of Update Reference Table Updating Section

Figure 9:
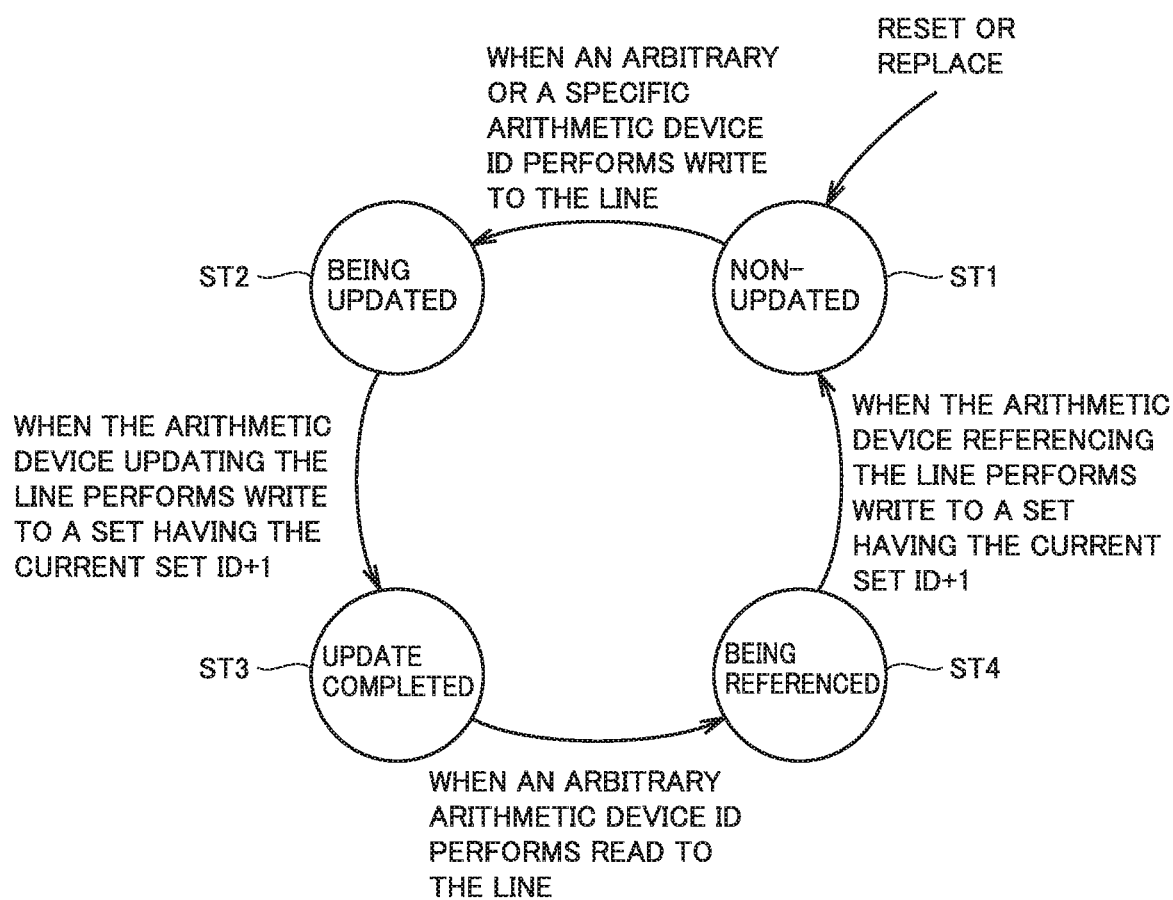
FIG. 9 is a diagram illustrating an exemplary state transition of each line in an update reference table updating section 51.

FIG. 9 is a diagram illustrating an exemplary state transition of each line in the update reference table updating section 51.

With reference to FIGS. 8 and 9, each line specified by the set ID and the way ID has one of 4 states: non-updated state ST1, being updated state ST2, update completed state ST3, and being referenced state ST4. After a line is reset or replaced, the update reference table updating section 51 assigns the non-updated state ST1 to the line.

When an arithmetic device having the arithmetic device ID performs write to the line, the update reference table updating section 51 assigns the updating state ST2 to the line, and stores the ID of the arithmetic device that performed the write in the updating arithmetic device ID field of the update reference table 52 associated with the line. When an arithmetic device having the arithmetic device ID performs the write to a set subsequent to the set to which the line belongs (in other words, the current set ID+1), the update reference table updating section 51 determines that the update by the arithmetic device is completed, and assigns the update completed state ST3 to the line.

Thereafter, when an arbitrary arithmetic device performs read to the line, the update reference table updating section 51 assigns the being referenced state ST4 to the line, and stores the ID of the arithmetic device that performed the write in the updating arithmetic device ID field of the update reference table 52 associated with the line. Similar to the case of updating, when the arithmetic device having the arithmetic device ID performs the read to a set (in other words, the current set ID+1) subsequent to the set to which the line belongs, the update reference table updating section 51 determines that the reference by the arithmetic device is completed, assigns the non-updated state ST1 to the line and clears the arithmetic device ID being updated and the arithmetic device ID being referenced in the field.

It is acceptable that only a specific arithmetic device is registered in advance as a priority control target, and the state transition may be only be caused by the write performed by the specific arithmetic device at the transition condition to the updating described above.

Details of Operation of Replace Selecting Section

FIG. 10 is a functional block diagram for explaining the details of the operation of the replace selecting section. With reference to FIGS. 2 and 10, the replacement target selection section 33 is a functional block configured to specify the position of a cache to be replaced based on the LRU table 32, the replacement mask 70 and the update reference priority 56.

First, the replacement target selecting section 33 obtains an entry 80 associated with the set being accessed from the LRU table 32. The access order for each way is stored in the entry 80 of the LRU table 32. The replacement target selecting section 33 calculates the product of each bit of the associated entry 80 of the LRU table 32 and the inverse of value of the associated bit of the replacement mask 70 having "1" or "0". In the operation result 83, "0" means that it is a way not to be replaced. The other operation results mean the access order for each way.

Next, based on the update reference priority 56 for each way described with reference to FIG. 8, the demultiplexer 85 (DEMUX) divides the operation result 83 (i.e., the access order for each masked way) into a combination of ways having the same update reference priority. In the example of FIG. 10, since the way IDs 0 and 3 have the same update reference priority of "1", the calculation results "1" and "3" for the way IDs 0 and 3 are stored respectively at the position of an associated way in the memory section 86_1. Since the way ID 1 has an update reference priority of "2", the operation result "2" for the way ID 1 is stored at the position of an associated way in the memory section 86_2.

Thereafter, the replacement way selecting sections 87_0 to 87_3 at the respective priorities select ways with the oldest access order. If all ways are "0", which means they are not to be replaced, no way is to be selected ("-" in FIG. 10). Specifically, in the example of FIG. 10, the replacement way selecting section 87_1 at the priority of 1 selects way ID=3 which has the oldest access order (in other words, the access order is 3), and the replacement way selecting section 87_2 at the priority of 2 selects the way ID=1 which has the oldest access order (in other words, the access order is 2).

Finally, the replacement way selecting section 89 that takes the priority into consideration checks the determination results in order from the highest priority (i.e., 88_3, 88_2, 88_1, 88_0) and decides a way to be replaced. In the example of FIG. 10, a replacement way ID=1, which is the selection result of a replacement way at the priority of 2, is selected as the final replacement way.

Summary

The main features of the cache device in the information processing apparatus of the present embodiment are summarized as follows.

Configuration of Cache

The cache device 10 in the information processing apparatus according to the present embodiment is configured to divide the memory space into a plurality of regions RG1 to RG4, and includes a plurality of caches CS1 to CS4 configured to exclusively store data from a respective one of the plurality of regions.

According to the cache device having the above configuration, although there are a plurality of caches CS1 to CS4 in the same hierarchy, since each cache CS is stored with different data, a coherence mechanism is unnecessary, which makes it possible to suppress the performance degradation due to data synchronization. Moreover, since the accesses from the plurality of arithmetic devices AR1 to AR4 are distributed to different caches according to the addresses, it is possible to suppress the access competition to each cache CS and the occurrence frequency of thrashing, and as a result, it is possible to improve the system performance of the information processing apparatus.

Connection Between Arithmetic Device and Cache

Each arithmetic device AR may be limitedly connected to one or more caches associated with the memory regions required to be accessed. Each arithmetic device AR may be selectively connected to any of one or more caches CS according to the address of memory to which the arithmetic device AR needs to access.

By simplifying the connection between each arithmetic device AR and each cache CS in this manner, it is possible to prevent hardware from becoming complicated, which makes it possible to further improve the bus performance (i.e., the performance of the cache access bus CBUS).

Replacement Scheme for Preventing Thrashing

Each cache CS is provided with an MRU table 42 as a first memory section configured to store the position in the cache recently accessed by each arithmetic device AR (i.e., a combination of the set ID and the way ID). Based on the MRU table 42, the replacement target selecting section 33 excludes (i.e., masks) a cache, which is being accessed at the time when a cache mistake occurs by an arithmetic device AR other than the arithmetic device AR which caused the cache mistake, from the data replacement target. As a result, it is possible to prevent thrashing from occurring between the arithmetic devices AR, and consequently improve the system performance of the information processing apparatus.

Replacement Scheme for Improving Data Reusability

Each cache CS is provided with a means (i.e., an update reference controller 50) configured to determine, for each position to be replaced in the cache, a status indicating that data is being updated by an arithmetic device AR and a status indicating that data is being referenced by the same arithmetic device or another arithmetic device after the data is updated. In order to perform the above determination, each cache CS includes an update reference table 52 as a second memory section configured to store at least the information whether or not the data is updated and whether or not the data is referenced after updating.

As a result, regarding the data updated by an arithmetic device AR, the priority to replace the data may be lowered until it is referenced by the same arithmetic device or other arithmetic device. In other words, the replacement target selecting section 33 excludes the data that is not referenced after the update of the data from the replacement target. As a result, the data reusability is improved, and thereby improving the system performance.

According to the configuration of the cache device, it is possible to improve the processing speed of a system in which a plurality of arithmetic devices such as a dedicated circuit (such as an ASIC or an FPGA) and a multiprocessor share memory and the ratio of data shared among the arithmetic devices is high.

Modification Example

The cache device 10 in the information processing apparatus of the present embodiment may be modified as follows.

Multi-Port Support Cache

Although only one port cache is described in the present embodiment, each cache CS may be multi-port compliant. In this case, each cache CS may have a number of interfaces with the arithmetic device AR equal to the number of ports. With such configuration, it is possible to solve the access competition between the arithmetic devices sharing a memory, and thereby improving the access performance.

Lower Level Cache

Although only the level 1 cache CS is described in the present embodiment, a lower level cache may be arranged in one hierarchy or a plurality of hierarchies between each cache CS and the memory access bus MBUS. In this case, the lower level cache may take either a private cache scheme or a shared cache scheme. In the private cache scheme, as in the case of level 1 cache, the coherence mechanism is unnecessary.

It should be understood that the embodiments disclosed herein have been presented for the purpose of illustration and description but not limited in all aspects. It is intended that the scope of the present invention is not limited to the description above but defined by the scope of the claims and encompasses all modifications equivalent in meaning and scope to the claims.

REFERENCE SIGNS LIST

10: cache device; 20: cache core; 21: cache access controller; 22: memory access controller; 30: LRU controller; 31: LRU updating section; 32: LRU table; 33: replacement target selecting section; 40: MRU controller; 41: MRU updating section; 42: MRU table; 43: replacement mask generating section; 50: update reference controller; 51: update reference table updating section; 52: update reference table; 53: update reference priority generating section; 56: update reference priority; 70: replacement mask; AR: arithmetic device; CBUS: cache access bus; CS: cache; MBUS: memory access bus; MCTL: memory controller; MEM: memory unit; RG1-RG4: region

The invention claimed is:

1. An information processing apparatus comprising:
a plurality of arithmetic devices;
a memory unit shared by the plurality of arithmetic devices; and
a cache device,
the cache device being configured to divide the memory space of the memory unit into a plurality of regions and including a plurality of caches in the same hierarchy, each of which is associated with a respective one of the plurality of regions,
each cache including a cache core configured to exclusively store data from a respective one of the plurality of regions,
wherein a coherence mechanism is not provided for the plurality of caches.

2. The information processing apparatus according to claim 1, wherein each of the arithmetic devices is configured to selectively connect to a cache associated with a region which is required to be accessed by the arithmetic device among the plurality of regions of the memory unit.

3. The information processing apparatus according to claim 1, wherein each cache further includes:
a first memory section configured to store a position in the cache core that is lastly accessed by each of the arithmetic devices; and
a replacement target selecting section configured to exclude the position in the cache core stored in the first memory section from the replacement target.

4. The information processing apparatus according to claim 3, wherein the replacement target selecting section is configured to add a position that is lastly accessed by the arithmetic device which caused a cache mistake among the positions in the cache core stored in the first memory section to the replacement target.

5. The information processing apparatus according to claim 3, wherein
each cache further includes a second memory section configured to store whether or not data is updated and whether the data is referenced after the updating at each position being a unit for replacement in the cache core, and
the replacement target selecting section is configured to exclude data that is not referenced again after the updating from the replacement target.

6. The information processing apparatus according to claim 1, wherein the cache device further includes at least one cache in a lower level hierarchy than the plurality of caches.

7. An information processing apparatus comprising:
a plurality of arithmetic devices;
a memory unit shared by the plurality of arithmetic devices; and
a cache device,
the cache device being configured to divide the memory space of the memory unit into a plurality of regions and including a plurality of caches in the same hierarchy, each of which is associated with a respective one of the plurality of regions,
each cache including a cache core configured to exclusively store data from a respective one of the plurality of regions
wherein each cache further includes:
a first memory section configured to store a position in the cache core that is lastly accessed by each of the arithmetic devices;
a replacement target selecting section configured to exclude the position in the cache core stored in the first memory section from the replacement target; and
a second memory section configured to store whether or not data is updated and whether the data is referenced after the updating at each position being a unit for replacement in the cache core, and wherein the replacement target selecting section is configured to exclude data that is not referenced again after the updating from the replacement target.

8. An information processing apparatus comprising:
a plurality of arithmetic devices;
a memory unit shared by the plurality of arithmetic devices; and
a cache device including a plurality of caches,
each cache comprising:
a cache core constituted by a set associative cache having a plurality of ways; and
a replacement target selecting section configured to determine, from the plurality of ways, a way to be preferentially replaced when a cache mistake occurs, based on preset information indicating a correspondence relationship between a priority and a state of access to a cache line from any of the plurality of arithmetic devices.

9. The information processing apparatus according to claim 8, wherein a memory space of the memory unit is divided into a plurality of regions, the plurality of caches are in the same hierarchy, each of the plurality of caches is associated with a respective one of the plurality of regions, and the cache core of each cache is configured to exclusively store data from a respective one of the plurality of regions.

10. The information processing apparatus according to claim 9, wherein each cache further includes a first memory section configured to store a position in the cache core that is lastly accessed by each of the arithmetic devices, the replacement target selecting section is configured to exclude the position in the cache core stored in the first memory section from the replacement target.

11. The information processing apparatus according to claim 10, wherein the replacement target selecting section is configured to add a position that is lastly accessed by the arithmetic device which caused a cache mistake among the positions in the cache core stored in the first memory section to the replacement target.

12. The information processing apparatus according to claim 10, wherein each cache further includes a second memory section configured to store whether or not data is updated and whether the data is referenced after the updating at each position being a unit for replacement in the cache core, and the replacement target selecting section is configured to exclude data that is not referenced again after the updating from the replacement target.

13. The information processing apparatus according to claim 9, wherein a coherence mechanism is not provided for the plurality of caches.

14. The information processing apparatus according to claim 9, wherein each of the arithmetic devices is configured to selectively connect to a cache associated with a region which is required to be accessed by the arithmetic device among the plurality of regions of the memory unit.

15. The information processing apparatus according to claim 8, wherein the cache device further includes at least one cache in a lower level hierarchy than the plurality of caches.

* * * * *